United States Patent [19]

Aiba

[11] Patent Number: 4,919,499
[45] Date of Patent: Apr. 24, 1990

[54] OPTICAL PRINTER OF SCANING TYPE
[75] Inventor: Masahiko Aiba, Nara, Japan
[73] Assignee: Sharp Kabushiki Kaisha, Osaka, Japan
[21] Appl. No.: 206,734
[22] Filed: Jun. 15, 1988
[30] Foreign Application Priority Data Jun. 15, 1987 [JP] Japan .................... 62-148808

[51] Int. Cl.⁵ .................... G02B 26/10; G01D 15/06
[52] U.S. Cl. .................... 350/6.6; 355/233; 346/160
[58] Field of Search .......... 350/6.6, 6.5, 6.1, 486; 355/233; 346/108, 160

[56] References Cited

U.S. PATENT DOCUMENTS

| | | | |
|---|---|---|---|
| 3,668,984 | 6/1972 | Rosin | 354/10 |
| 3,734,591 | 5/1973 | Howe | 350/6.6 |
| 4,123,146 | 10/1986 | Dragt | 350/6.5 |
| 4,560,925 | 12/1985 | Niven et al. | 350/486 |
| 4,613,203 | 9/1986 | Proetel et al. | 350/6.6 |
| 4,659,932 | 4/1987 | Roll | 350/6.6 |
| 4,738,500 | 4/1988 | Grupp et al. | 350/6.5 |

Primary Examiner—Bruce Y. Arnold
Assistant Examiner—Ronald M. Kachmarik

[57] ABSTRACT

An optical printer of the scanning type includes a light emitting element which is drivable in accordance with printing data for emitting light. The printer also includes an optical system which passes the light through the system to focus the light on a photosensitive member. A mirror is movably interposed between the optical system and the photosensitive member to deflect the beam from the optical system, thereby causing the beam to scan the photosensitive member at a high speed. To realize the scanning process, an operation assembly supports the mirror to pivotally move the mirror so that the mirror's reflecting surfaces faces toward the light emitting element by subjecting the mirror to a simple harmonic motion within a specified range of angles.

8 Claims, 4 Drawing Sheets left end — center position on photosensitive member — right end

OPTICAL PRINTER OF SCANING TYPE

FIELD OF THE INVENTION

The present invention relates to optical printers of the scanning type, such as laser printers, wherein a beam of light produced in accordance with printing data is deflected by a movable mirror to scan the surface of a photosensitive member.

RELATED ART STATEMENT

With reference to FIG. 4, a laser printer which is typical of such scanning optical printers comprises a laser diode 1 which is intermittently driven according to printing data to emit a laser beam. The beam from the laser diode 1 is passed through a collimator lens 2 and focused on a photosensitive member 3 in the form of a drum. A rotary polygonal mirror 4 is interposed between the collimator lens 2 and the photosensitive member 3. The beam passes through the collimator lens 2 and is deflected by the polygonal mirror 4 to scan the photosensitive member 3 at a high speed. The laser diode 1 is turned on and off timed with the detection signal from a start sensor 5, with the rotation of the mirror 4 by a drive motor (not shown), whereby the surface of the member 3 can be exposed to the beam locally (see U.S. Pat. No. 3,867,571 showing an example of similar arrangement).

The rotary polygonal mirror 4 serving as a scanner for deflecting the laser beam for scanning is rotated at a constant speed by the motor, with the result that the reflected laser beam scans the photosensitive member 3 at a constant angular velocity. However, the distance from the reflecting facet of the polygonal mirror 4 to the surface of the member 3 increases from the center of the member 3 towards each end, so that when the printing data is fed at a constant speed, the speed of the spot of light on the surface of the member 3 to be scanned increases toward each end to result in an increased dot pitch. The speed of the spot will now be calculated. For simplification, the spot speed will be calculated for the arrangement of FIG. 5 wherein a rotary plane mirror 6 is substituted for the polygonal mirror 4 in FIG. 4. The error due to the substitution is very small since the distance from the center of rotation of the plane mirror 6 to its reflecting surface is exceedingly smaller than the distance from the center of rotation to the surface of the photosensitive member 3. When it is assumed that the angle between the optical axis of the laser diode 1 and the plane mirror 6 is $\theta + 45°$, the distance x from the center position S on the photosensitive member 3 to the spot position P is given by $x = l \tan 2\theta$ wherein $\theta = \omega t$, and $\omega$ is the rotational angular velocity of the plane mirror 6. Accordingly, the speed v of the spot on the photosensitive member 3 is expressed by $$v(t) = \frac{dx}{dt} = 2\omega l \sec^2(2\omega t)$$

The spot speed ratio is given by $$\frac{v(t)}{vt = 0} = \sec^2(2\omega t)$$

FIG. 6 shows the relationship between the spot position and the spot speed ratio.

The f (focal distance)$-\theta$ (angle of incidence) distortion is corrected generally by a special lens 7 termed an "f$-\theta$ lens" and interposed between the polygonal mirror 4 and the photosensitive member 3 as seen in FIG. 7 so as to assure constant-velocity scanning. The f$-\theta$ lens 7 has such nature that the incident light is deflected inward toward its outer periphery and serves to focus the beam on the photosensitive member 3 and to make the scanning distance proportional to the scanning time.

Nevertheless, the f$-\theta$ lens is a very special lens which requires high precision, is extremely expensive and renders the laser printer costly. Besides the f$-\theta$ lens 7 serving as optical f$-\theta$ correction means, another f$-\theta$ correction is available which resorts to the processing of an electric signal and by which the clock frequency for determining the printing data reading speed is altered in corresponding relation to the angle of deflection of the laser beam by the polygonal mirror, and therefore, to the variation in the spot speed. The latter means, however, requires a very high oscillation frequency, needs an expensive control IC, etc., is costly and complex in construction, makes the printer large-sized, and is unsuited for use.

SUMMARY OF THE INVENTION

The main object of the present invention is to provide an optical printer of the scanning type wherein f$-\theta$ distortion is correctable by inexpensive optical means.

To fulfill the above object, the present invention provides an optical printer of the scanning type which comprises a light emitting element drivable in accordance with printing data for emitting light, an optical system for passing the light therethrough to focus the light on a photosensitive member, a mirror movably interposed between the optical system and the photosensitive member for deflecting the beam from the optical system to cause the beam to scan the photosensitive member at a high speed, and an operation assembly for supporting the mirror pivotally movably so as to direct its reflecting surface toward the light emitting element and for subjecting the mirror to a simple harmonic motion within a specified range of angles.

More specifically, the operation assembly preferably comprises a vibration arm having a mirror fixed thereto, a support member pivotably supporting the arm thereon for pivotally moving the mirror reflecting surface as directed toward the light emitting element, a magnetic member secured to one end of the vibration arm, and a drive winding opposed to the magnetic member for periodically exerting a magnetic force on the magnetic member to subject the mirror to the simple harmonic motion within the specified range of angles. The support member has a knife-edge portion in contact with the vibration arm, or a pivot inserted through the vibration arm.

BRIEF DESCRIPTION OF THE DRAWINGS

FIG. 1 is a diagram showing an optical system;

FIGS. 2 and 3 are a diagram of an operation assembly and a block diagram of a control system, respectively;

DESCRIPTION OF THE PREFERRED EMBODIMENTS

Figure 1:
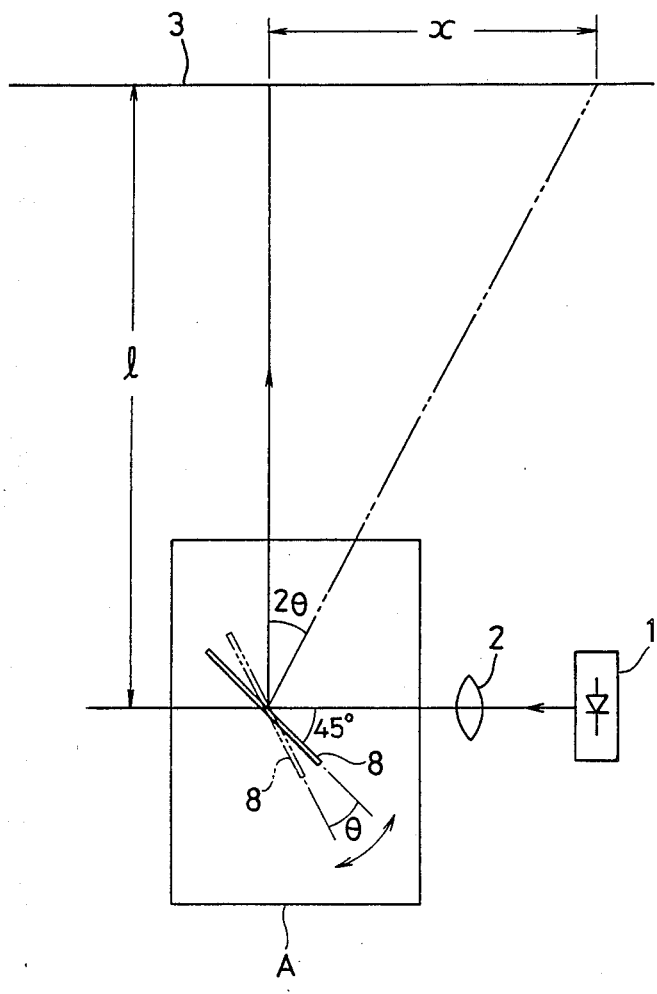
FIGS. 1 to 3 show a scanning optical printer embodying the invention.

A preferred embodiment of the invention will be described below with reference to the drawings concerned.

Throughout FIGS. 1, 4, 5 and 7, like parts are referred to by like reference numerals. The embodiment shown in FIG. 1 includes a plane mirror 8 serving as a scanner. The plane mirror 8 is pivotally movably provided and has its reflecting surface directed toward the light emitting element 1 comprising a laser diode.

Figure 2:
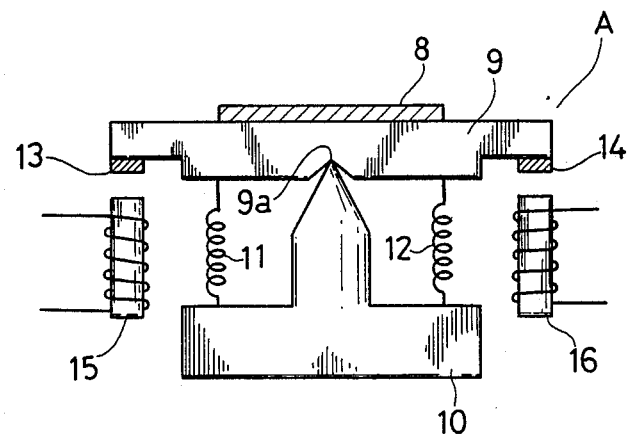

The plane mirror 8 is subjected to a simple harmonic motion within a specified range of angles by an operation assembly A, which has the construction shown in FIG. 2. Stated more specifically, a vibration arm 9 having the plane mirror 8 fixedly joined thereto is supported at an intermediate notched portion 9a thereof by a knife-edge portion of a support member 10. The arm 9 is also supported at its respective side portions by springs 11 and 12 which are identical in spring constant. Thus, the vibration arm 9 is pivotally movable freely within the specified angular range. The arm 9 is further fixedly provided with magnets 13 and 14 on the lower surface of its respective ends. A drive winding 15 and a vibration sensor 16 are arranged in opposed relation to the magnets 13 and 14, respectively. The drive winding 15 biases the vibration arm 9 into pivotal movement by means of the magnet 13, while the vibration sensor 16 is adapted to detect the amplitude of movement of the arm 9. The resonance frequency of the simple harmonic motion system for the plane mirror 8 is determined by the spring constant of the springs 11, 12 and the moment of inertia of the arm 9. The resonance frequency is in match with the drive frequency determined by the vibration winding 15 and the magnet 13 when the operation assembly A is used.

Figure 3:
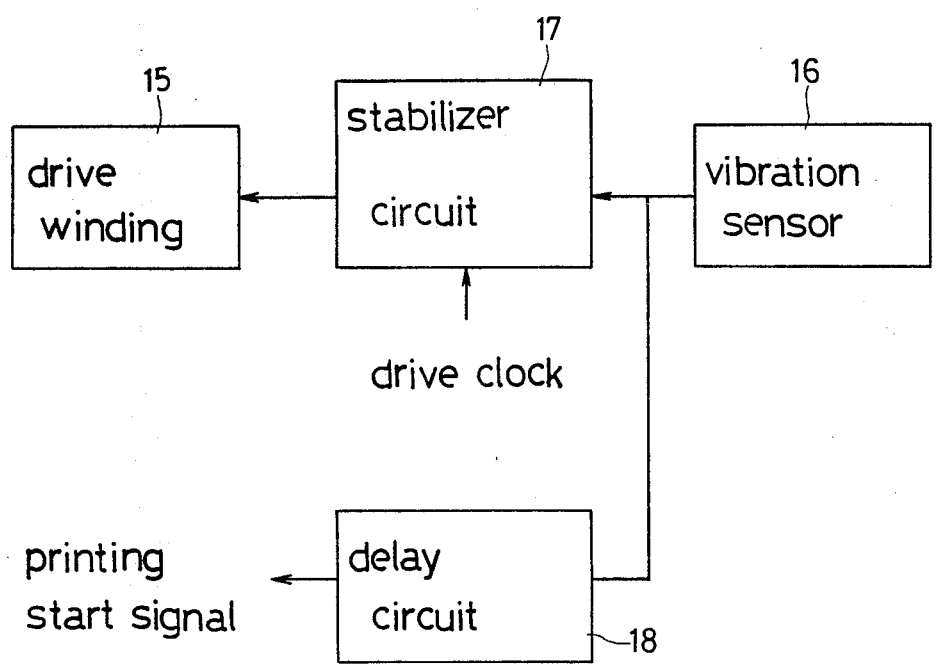
Figure 4:
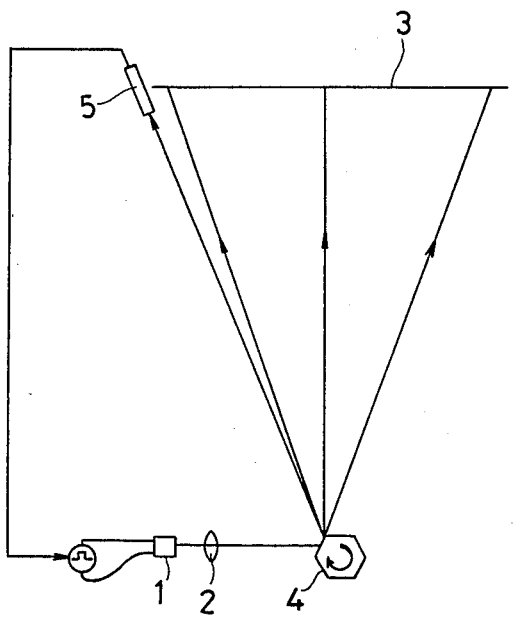
FIG. 4 is a diagram of a laser printer optical system having no f$-\theta$ correction means.
Figure 5:
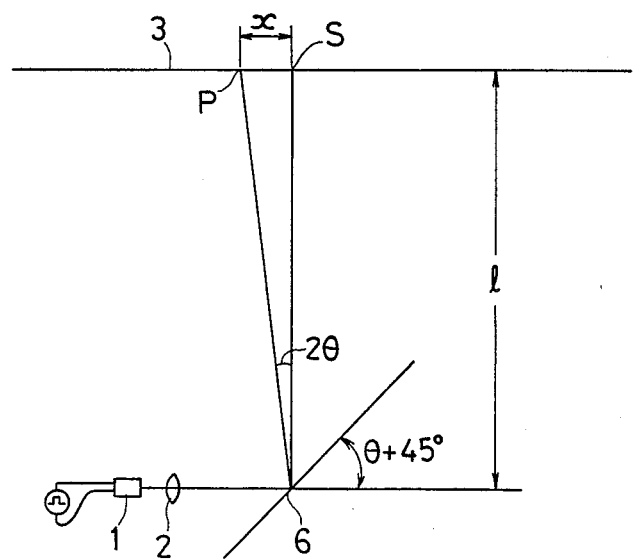
FIG. 5 is a diagram of an optical system for illustrating the need of f$-\theta$ correction.
Figure 6:
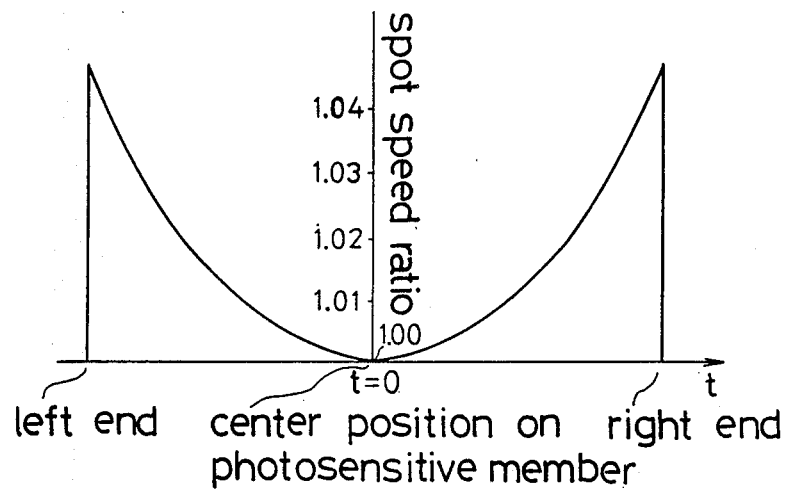
FIG. 6 is a diagram showing the relation between the spot position on the surface of photosensitive member of FIG. 4 and the spot speed ratio.
Figure 7:
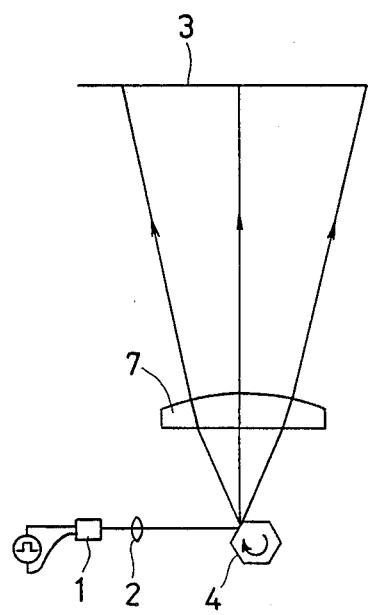
FIG. 7 is a diagram showing a conventional laser printer optical system including f−θ correction means.

FIG. 3 shows a control circuit for bringing the vibration arm 9 into the simple harmonic motion with a constant amplitude. Variations in the amplitude of the arm 9 are detected by the sensor 16, which in turn feeds an amplitude detection signal to an amplitude stabilizer circuit 17. While the drive winding 15 is driven by a drive signal prepared based on a drive clock, this drive signal is altered in the circuit 17 in accordance with the amplitude detection signal from the sensor 16 and then given to the drive winding 15. Thus, the drive winding 15 is subjected to feedback control by the detection signal, whereby the vibration arm 9 is maintained at the constant amplitude. The output signal of the vibration signal 16 is also fed to a delay circuit 18, by which the signal is delayed for a predetermined period of time to serve as a printing start signal. This eliminates the need to use the start sensor 5 shown in FIG. 4. More specifically, to start printing upon the laser beam advancing into the effective printing region, the start sensor 5 is generally used for detecting this printing start timing. With the present embodiment, however, the vibration arm 9 is so controlled as to move with the constant amplitude, so that the output signal from the vibration sensor 16 is usable as the printing start signal when delayed for a time interval required for the beam to enter the effective printing region.

Next, the operation of the present embodiment will be described. With reference to FIG. 1, the distance x from the center position on the photosensitive member 3 to the scanning position of the beam is $x = l \tan 2\theta$. Assuming that when the predetermined maximum amplitude angle of the plane mirror 8 is a, the angle of deflection, $\theta$, of the plane mirror 8 is given by $\theta = a \sin \omega t$, $x = \tan(2a \sin \omega t)$. The speed of the spot of light, v, is given by $$v = \frac{dx}{dt} = \frac{2al\omega \cos \omega t}{\cos^2(2a \sin \omega t)}$$

The spot speed ratio vN as normalized $[v(t=0)=1]$ at the scanning speed $[v(t=0)]$ of the beam at the center position on the photosensitive member 3 is expressed by $$vN = \frac{\cos \omega t}{\cos^2(2a \sin \omega t)}$$

From $\theta = a \sin \omega t$, $$\cos \omega t = \sqrt{1 - (\theta/a)^2}$$

$$vN = \frac{\sqrt{1 - (\theta/a)^2}}{\cos^2(2\theta)}$$

For comparison, the spot speed v' in the case of the existing rotary polygonal mirror is given by $$v' = \frac{2\omega l}{\cos^2 2\omega t}$$

since $x = l \tan 2\omega t$. The spot speed ratio vC as normalized similarly is expressed by $$vC = \frac{1}{\cos^2 \omega t}$$

Thus, the spot speed ratio vN by the simple harmonic motion of the plane mirror 8 of the invention is expressed by $$vN = \frac{\sqrt{1 - (\theta/a)^2}}{\cos^2(2\theta)}$$

whereas the spot speed ratio vC by the constant-speed rotation of the existing rotary polygonal mirror is expressed by $$vC = \frac{1}{\cos^2(2\theta)}$$

The frequency of simple harmonic motion of the plane mirror 8 is preferably at a frequency of 300 to 1500 cycles/sec.

Next, listed below are spot speed ratios on the photosensitive member 3 at varying deflection angles $\theta$ of the plane mirror 8, i.e. at varying deflection angles of the beam when the maximum amplitude angle a is approximately 0.38 rad (21.75°). Since the spot speed ratios vN at positive and negative deflection angles $\theta$ have the same absolute value are equal, the ratios calculated for positive angles only are given. For comparison, the corresponding spot speed ratios vC by the existing rotary polygonal mirror are also listed.

| θ (deg) | vN | vC |
| --- | --- | --- |
| 0 | 1.0000 | 1.0000 |
| 1 | 1.0001 | 1.0012 |
| 2 | 1.0006 | 1.0048 |
| 3 | 1.0013 | 1.0110 |
| 4 | 1.0023 | 1.0197 |
| 5 | 1.0034 | 1.0310 |
| 6 | 1.0046 | 1.0451 |
| 7 | 1.0056 | 1.0621 |
| 8 | 1.0063 | 1.0822 |
| 9 | 1.0064 | 1.1055 |
| 10 | 1.0056 | 1.1324 |
| 11 | 1.0035 | 1.1632 |
| 12 | 0.9993 | 1.1982 |
| 13 | 0.9924 | 1.2378 |
| 14 | 0.9816 | 1.2827 |
| 15 | 0.9655 | 1.3333 |

The table reveals the following. When the existing rotary polygonal mirror is rotated at a constant speed for scanning, the scanning velocity of the beam increases by about 20% in the range of deflection angles $\theta$ of 12.5° as indicated by the broken line, whereas with the plane mirror 8 of the present invention which is brought into a simple harmonic motion for scanning, the errors in the velocity can be reduced to not greater than about 0.7% of the value at a deflection angle $\theta$ of 9° in the same angular range of 12.5°. This is attributable to the simple harmonic motion of the plane mirror 8, i.e. the receprocating motion thereof in the specified range, although the rotary polygonal mirror is rotated at a constant speed regardless of the deflection angle $\theta$. The speed of motion of the plane mirror 8 gradually decreases as the mirror approaches the return position at either side beyond the midpoint of range of its motion. The decrease in the speed of motion of the mirror 8 is offset by the speed of spot of the beam which increases as the spot moves from the center position on the photosensitive member 3 toward either end, with the result that the scanning velocity can be maintained at a substantially constant value over the entire area to be scanned. In this way, the $f-\theta$ distortion is corrected without necessitating the $f-\theta$ lens or electric $f-\theta$ correction means.

The present invention is not limited to the above embodiment only but can be embodied variously within the scope of the present invention as defined in the appended claims. For example, the mirror is not limited to a plane mirror but can be one having at least one reflecting face.

With the optical printer of the scanning type according to the present invention, a mirror serving as its scanner is adapted for a simple harmonic motion within a specified angular range instead of rotation, so that the speed of spot of the scanning beam which increases as the spot moves from the center position on the photosensitive member toward each end is offset by the speed of the mirror which conversely decreases. This minimizes the variations in the scanning velocity over the area to be scanned to correct the $f-\theta$ distortion without necessitating the expensive $f-\theta$ lens or electric $f-\theta$ correction means, consequently rendering the printer less costly and smaller.

While the mirror is subjected to a simple harmonic motion within a specified angular range, this motion is effected preferably at a frequency of 300 to 1500 cycles/sec through a max amplitude angle of 21° to 22.5°.

When the max amplitude angle is greatly apart from the above range, the effective angle becomes smaller, so that it becomes difficult to use this mirror.

The effective angle, which is defined as the angle where the speed of spot on the photosensitive member is generally constant, is the angle having the value of 57% of the above max amplitude angle and being located at the middle part of it.

With the present invention, the photosensitive member may be scanned for recording printing data in the forward direction or reverse direction only and also be scanned in the forward direction and reverse direction alternately.

What is claimed is:

1. An optical printer of the scanning type comprising:
  a light emitting element drivable in accordance with printing data for emitting light;
  an optical system to focus said light from said light emitting element onto a photosensitive member;
  mirror means, movably interposed between said optical system and said photosensitive member, for deflecting the focused light from said optical system to cause the focused light to scan said photosensitive member at a high speed; and
  driving means for pivotally movably supporting said mirror means so as to direct a reflecting surface of said mirror means toward said light emitting element and simple harmonic motion within a specified range of angles, thereby minimizing variations in scanning velocity.

2. The printer as claimed in claim 1 wherein said driving means comprises:
  a vibration arm having said mirror means fixed thereto;
  a support member pivotable supporting said vibration arm thereon for pivotally moving said reflecting surface toward said light emitting element;
  a magnetic member secured to one end of said vibration arm; and
  drive winding means, opposed to said magnetic member, for periodically exerting a magnetic force on said magnetic member, thereby subjecting said mirror means to said simple harmonic motion within said specified range of angles.

3. The printer as claimed in claim 2 wherein said vibration arm is connected to said support member by a pair of coiled springs each having a same spring constant.

4. The printer as claimed in claim 3 wherein said drive winding means and and magnetic member are adapted so that a drive frequency is equal to a resonance frequency of said mirror means, said resonance frequency being determined by said spring constant of said pair of springs and a moment of inertia of said vibration arm.

5. The printer as claimed in claim 2 wherein said vibration arm is fixedly provided with a magnet at another end thereof, and a vibration sensor is opposed to said magnet for detecting an amplitude of said vibration arm.

6. The printer as claimed in claim 5 wherein said drive winding means is subjected to feedback control by an amplitude stabilizer circuit for receiving an amplitude detection signal from said vibration sensor, said amplitude of said vibration arm being maintained at a constant value.

7. The printer as claimed in claim 5 wherein said vibration sensor is electrically connected to a delay circuit for delaying an output signal of said vibration sensor by a predetermined period of time and delivering the delayed signal as a printing start signal.

8. The printer as claimed in claim 2 wherein said magnetic member fixed to said one end of said vibration arm is a magnet.

* * * * *